Oct. 25, 1938.

V. G. VAUGHAN ET AL 2,134,540

THERMAL MOTOR PROTECTIVE DEVICE

Filed Dec. 12, 1934

WITNESSES:
Wm. C. Groome
R. J. Fitzgerald

INVENTORS.
Earl K. Clark &
Victor G. Vaughan.
BY
N. M. Biebel
ATTORNEY

Oct. 25, 1938.　　V. G. VAUGHAN ET AL　　2,134,540
THERMAL MOTOR PROTECTIVE DEVICE
Filed Dec. 12, 1934　　2 Sheets—Sheet 2
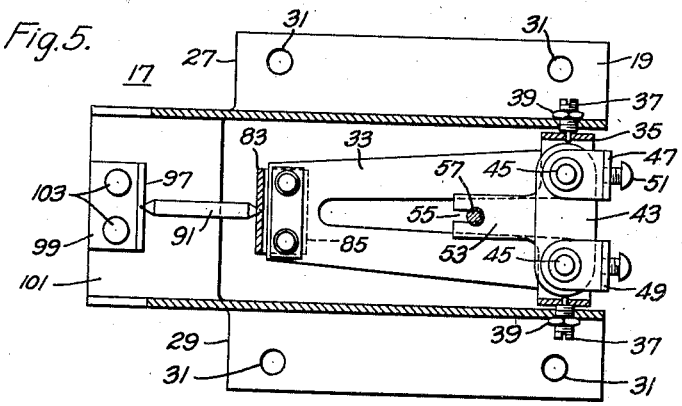
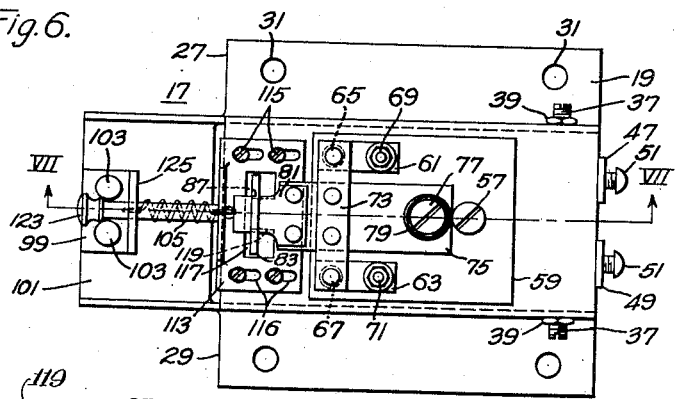
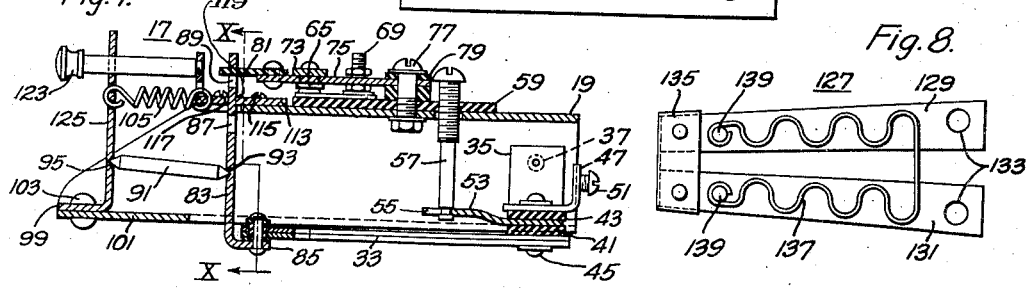
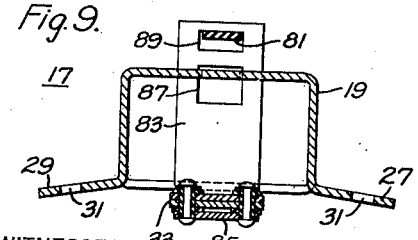
WITNESSES:
Wm. C. Groome
P. J. Fitzgerald
INVENTORS.
Earl K. Clark &
Victor G. Vaughan.
BY
N. M. Biehel
ATTORNEY Patented Oct. 25, 1938

2,134,540

UNITED STATES PATENT OFFICE 2,134,540

THERMAL MOTOR PROTECTIVE DEVICE

Victor G. Vaughan, Attleboro, Mass., and Earl K. Clark, Mansfield, Ohio, assignors to Westinghouse Electric & Manufacturing Company, East Pittsburgh, Pa., a corporation of Pennsylvania Application December 12, 1934, Serial No. 757,144

7 Claims. (Cl. 200—139)

Our invention relates to electric motors, and more particularly to thermal protection devices for use on electric motors.

An object of our invention is to provide a relatively simple and efficient thermal switch adapted to be located on an electric motor to control the energizing circuit thereof in accordance with the heating of the motor.

Another object of our invention is to provide a relatively simple thermal relay actuated in accordance with the temperature rise of a part of the motor to control the energizing circuit and to effect reenergization of the motor circuit either automatically in accordance with temperature drop in the motor, or manually by an operator.

Other objects of our invention will either be specifically pointed out hereinafter, or will be apparent, without further description, from a disclosure of one form of device now preferred by us.

In practicing our invention, we provide a thin sheet metal casing open at both ends and at one side thereof, and having means for securing it in proper operative position against a motor frame or housing, a pivotally and adjustably mounted bimetal element, of substantially U-shape, in the metal casing in the open side thereof, means to adjust the position of the bimetal element actuable from the outside of the casing, cooperating contact members insulatedly mounted on the outside of the casing, and means including a toggle pin and a spring cooperating with the free end of the bimetal element to effect opening or disengagement of the contact members by impact and with a snap action.

In a modified form of the device a latch is provided to cooperate with the contact-actuating bar to hold it in its open position, the latch being provided with manually operable means to release the same.

In the accompanying drawings:

Fig. 5 is a view in horizontal longitudinal section therethrough taken on the line V—V of Fig. 3;

Fig. 6 is a top plan view of a modified form of device embodying our invention and including a latching means;

Fig. 7 is a view in vertical longitudinal section through the device shown in Fig. 6 and taken on the line VII—VII thereof;

Fig. 8 is a top plan view of a modified form of bimetal element which we may use;

Fig. 9 is a view in vertical lateral section of the device shown in Figs. 2 to 5 inclusive and taken on the line IX—IX of Fig. 3; and Fig. 10 is a view similar to Fig. 9 but taken on the line X—X of Fig. 7.

While we have illustrated and will describe a device embodying our invention as applied more particularly to an electric motor, we do not wish to be limited to such use only, although in our opinion, its greatest field of usefulness will be for such application.

Figure 1:
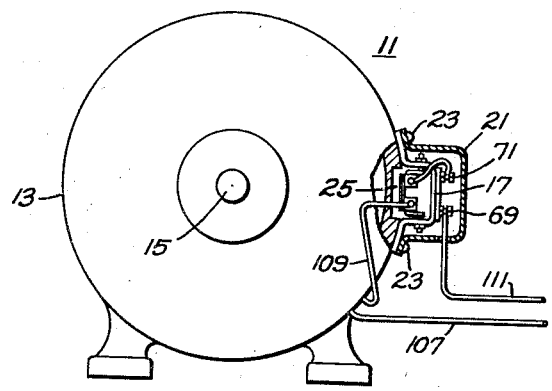
Figure 1 is a view in end elevation, partially in section, of one form of device embodying our invention shown as applied to an electric motor.

Referring to Fig. 1 of the drawings, we have illustrated, generally only, an electric motor 11, which may be of the usual design and construction, and include an outer metal housing 13, usually called a frame, energizing windings therefor, which are not shown in detail, and a rotor structure which is indicated generally only by a rotor shaft 15. In other words, the representation of the motor 11 in Fig. 1 of the drawings is general only, since the device more particularly embodying our invention is applicable to any kind of electric motor to control the energization thereof.

A thermal relay designated by the numeral 17 includes an open-ended casing 19, preferably made of relatively thin sheet metal and having one open side shown more particularly in Fig. 1 of the drawings, where the device 17 is secured against the frame 13 by screws 23 and is located under a suitable covering casing 21. We prefer to provide the frame 11 with a shallow recess 25, the casing 19 being adapted to be located over this recess for a purpose to be hereinafter more fully set forth. In order to provide means to secure the casing 19 against frame 13 it is provided with lateral flanges 27 and 29, having openings 31 therethrough, through which the screws 23 may extend.

A bimetal element 33 is pivotally mounted within the casing 19 and is of substantially U-shape, as may be seen more particularly by reference to Fig. 5 of the drawings. Member 33 is supported from a pivotally mounted bracket 35, which bracket is supported within the casing 19 near one end thereof by short externally threaded studs 37 having lock nuts 39 thereon to hold them in fixed position, substantially as shown more particularly in Fig. 4 of the drawings.

Figure 4:
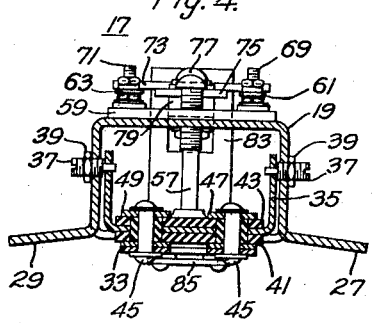
Fig. 4 is a view in vertical lateral section therethrough taken on the line IV—IV of Fig. 3.

Bimetal element 33 is suitably insulated from bracket 35 by bars 41 and 43 of electric-insulating material and the assembly is held in such relation by a pair of rivets 45 shown more particularly in Fig. 4 of the drawings. Terminal bars 47 and 49 of substantially L-shape are also supported on and by the bracket 35, the rivets 45 being in electrical connection not only with the ends of the bimetal element 33, but also with the terminal members 47 and 49 which may be provided with conductor-securing screws 51 to permit of connecting supply circuit conductors or other conductors thereto, in order that the bimetal element 33 of U-shape may be traversed either by the same current as traverses the energizing winding of electric motor 11, or by a current proportional thereto.

Bracket 35 has an integral lateral extension 53 extending toward the central portion of the casing, the end thereof having a small longitudinally-extending recess 55 therein (see Fig. 5), which may be engaged by the end of an adjusting screw 57 to permit of adjusting the initial position of bimetal element 33 for the purpose of varying the operating temperature of the device.

A plate 59 of electric-insulating material is located on the outer face of the central portion of casing 19 and has a pair of contact terminals 61 and 63 located thereon and which may be secured thereto in any manner known in the art. The contact terminals 61 and 63 may be provided at one end with the contact members 65 and 67 and at the other end with terminal screws 69 and 71, contact members 65 and 67 being adapted to be engaged by cooperating contact members on a contact bridging member 73, while terminal screws 69 and 71 may have secured thereto circuit conductors in a manner well known in the art. Contact bridging member 73 is supported at one end of a resilient bar 75, the other end of which is insulatedly mounted on the casing and on the outside of plate 59 by a short machine screw 77, suitable electric insulating members 79 being provided in a manner well known in the art. A short bar 81, of electric-insulating material, has one end thereof secured to member 75 and overhangs the same.

A contact bar actuating member 83 in the form of a metal bar having a laterally extending lower end portion 85 is insulatedly mounted on and secured to the movable end of bimetal element 33 in order to move therewith and at right angles thereto. Member 83 is provided with a lower opening 87 and an upper opening 89 therein for the purposes to be hereinafter described.

Figure 2:
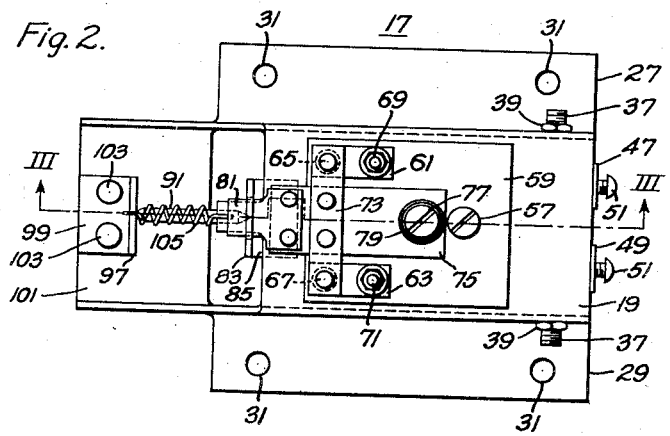
Fig. 2 is a top plan view of a thermal relay embodying our invention.
Figure 3:
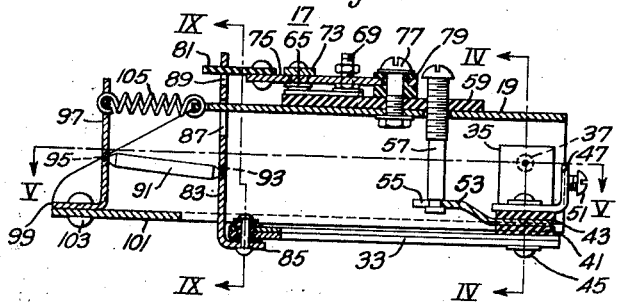
Fig. 3 is a view in longitudinal vertical section therethrough taken on the line III—III of Fig. 2.

Means for causing the bar 83 and the bimetal element 33 to move with a snap action include an over-center toggle pin 91 having pointed or sharp ends, one end of which pivotally engages a small recess 93 in member 83 while the other end thereof pivotally engages a small recess 95 in an abutment bar 97 which is of substantially L-shape, as shown more particularly in Fig. 3 of the drawings, and has its lower laterally-extending portion 99 secured to turned-in portions 101 of casing 19, as by a pair of rivets 103. The upper end of abutment member 97 is resiliently biased toward pin 91 and member 83 by a spring 105, one end of which is hooked into the upper end of member 97, while the other end thereof is hooked through an opening in the end portion of casing 19 substantially as shown in the drawings. The location of recesses 93 and 95 is such that the right-hand end of pin 91 (as seen in Figs. 2 and 3 of the drawings) is located slightly lower than is the left-hand end thereof, so that when the free end of bar 33 moves upwardly toward the central portion of casing 19, the right-hand end of pin 91 will move with it, and the design and construction of these parts is such that the free end of bimetal element 33 will move with a snap action.

The size of opening 89 is such, and the lower wall defining the opening is so located, that the lower wall will engage the underside of bar 81 when the movable parts are moving at a relatively high speed, so that the contact members are disengaged by impact and with a snap action. The size and location of opening 87 in member 83 is such as, in conjunction with tongue member 119 on plate 113, to limit the movement of member 83 both upwardly and downwardly, as hereinafter more fully described.

The motor 11 and particularly, the energizing windings thereof may be provided with leads 107 and 109 (as shown in Fig. 1 of the drawings), and the other end of lead 109 may be connected to terminal member 47 of the thermal relay 17. The terminal member 49 may be connected to terminal 71, while terminal 69 may be connected to a conductor 111, the conductors 107 and 111 being adapted to be connected, in the manner well known in the art, to a suitable source of supply of electric energy.

It will be here pointed out that the bimetal element 33 has a relatively large flat-surface area to receive heat by radiation from the frame surface in the recess 25, so that bimetal member 33 will closely follow the variations in the temperature of the frame 13 of motor 11. The operating temperature of the thermal relay may be varied by means of screw 57, which, as shown more particularly in Fig. 3 of the drawings, extends through member 59 and has screw-threaded engagement therewith. While we have shown our improved device as being mounted in heat-receiving relation with the frame of the motor, we do not desire to be limited thereto, since we may use the same general details of construction for a thermal relay which will be mounted on other parts of the motor, such as the energizing windings thereof.

Referring now to the device shown in Figs. 6, 7 and 10 thereof, a relatively large number of parts already hereinbefore described in connection with the device shown in Figs. 2 to 5 inclusive, are again employed, the main difference being that a manually releasable latch is employed to hold the contact members in their disengaged position. This latch includes a plate 113 which may be of metal and of substantially L-shape, and which is longitudinally slidable on the upper surface of casing 19 and particularly on the intermediate portion thereof, being guided by a pair of small machine screws 115 extending through elongated slots 116 at each lateral edge thereof.

Plate 113 is provided with an internal opening 117 through which member 83 extends, there being provided also a small tongue member 119 which is adapted to move into opening 87 in member 83 when member 83 has been moved vertically upwardly (as seen in Fig. 7 of the drawings) by the bending of bimetal element 33. This will prevent automatic reclosing of the thermal relay and consequent reengagement of the contact members with which the relay is provided, and in order to effect reclosing, latch plate 113 may be moved manually as by an operator's pushing on an actuating rod 123, one end of which is fixed in the laterally extending portion of plate 113, while the other end thereof is guided by an abutment plate 125 similar to abutment plate 97 hereinbefore described.

The device shown in Figs. 6, 7 and 10 will, therefore, operate to act as a temperature-limiting device rather than as a temperature-controlling device for the energy-translating device with which it may be operatively associated, and it will be noted that a relatively small change only is necessary in the design and construction of the device shown in Figs. 2 to 5 inclusive, to provide a temperature-limiting device. For this purpose, the toggle spring 105 has one end thereof in operative engagement with abutment arm 125, while its other end is in operative engagement with latch plate 113, so that latch plate 113 is resiliently biased against one face or side of actuating arm 33 and will move into opening 87 when permitted to do so by the upward movement of actuating arm 33.

Referring now to Fig. 8 of the drawings, we have there illustrated a modified form of bimetal element which we may use for certain purposes, the bimetal element 127 including two bimetal strips 129 and 131 located substantially, but not necessarily, parallel with each other, and having openings 133 at one end of the two bars through which the rivet members 45 hereinbefore described may extend. The other ends of the two bars may be secured together by means of one or more plates 135 of electric-insulating material, or if it is thought desirable, they may be secured together by metal plates properly electrically insulated from the two bimetal bars 129 and 131. A resistor element 137 which may be either of wire or of strip, is located in relatively close heat-transferring relation to the flat sides of the bimetal bars 129 and 131, the ends of resistor wire 137 being suitably electrically secured to the bimetal bars as by rivets or screws 139, so that any current entering, say, bimetal bar 129 at its right-hand end (as seen in Fig. 8 of the drawings) will traverse substantially the greater part of the length of bimetal bar 129, then will traverse resistor 137, then the greater part of the length of bar 131 and then will flow outwardly therefrom through other parts of the circuit.

Thus, if it is found that the bimetal element 33, which it is desired to use, has a relatively low ohmic resistance insufficient to cause heating and the proper or desired amount of bending thereof, we may use the added resistor element 137, which may be made of any suitable or desired ohmic resistance in accordance with the current value of the circuit to be controlled.

As is obvious, the thermal relay 17 shown in Figs. 2 to 5 of the drawings, and the thermal relay shown in Figs. 6, 7 and 10 of the drawings, are adapted to be controlled in accordance with the temperature rise of a certain part of an energy-translating device with which the respective relays are associated in such manner as to be heated thereby. So long as the current is substantially normal, no interruption of the energizing circuit will occur, but if an excessive overload occurs which continues for too great a length of time, the thermal relay will operate to interrupt the energizing circuit of the energy-translating device; and one form of our thermal relay will reclose the energizing circuit as soon as its temperature and that of the energy translating device have dropped to a low value, while in the modified form of device embodying our invention, an operator must manually reclose the circuit as by operating the latch plate.

The flat-face location of the bimetal element will cause it, as has already been hereinbefore noted, to closely follow temperature variations of the energy-translating device, so that proper protection of the device from excessive overloads and its resultant excessive temperature rise is assured.

Various further modifications may be made in the device embodying our invention without departing from the spirit and scope thereof, and we desire, therefore, that only such limitations shall be placed thereon as are imposed by the prior art or are set forth in the appended claims.

We claim as our invention:

1. A thermal protective device for an electric motor having a housing with a recess therein, comprising a thermal relay having a casing having an open side, a bimetal bar in the casing at the open side thereof, means to secure the casing against the motor housing with the bimetal bar located in the recess, a bracket in the casing having one end of the bimetal bar secured thereto, pivotal supports for the bracket in the side walls of the casing, an adjusting bar secured to the bracket, an adjusting screw engaging the casing and the adjusting bar to vary the position of the bimetal bar, a contact arm supported by the casing, a contact arm actuating bar secured to the movable end of the bimetal bar, and means including an over-center toggle pin spring-pressed against the actuating bar to cause the actuating bar to move the contact arm with a snap action.

2. A thermal protective device for an energy-translating device having a housing, comprising a thermal relay having a casing having an open side and securable against the housing with its open side thereagainst, a bimetal element in the casing at the open side, a support for one end of said bimetal element, a fixed contact and a movable contact arm on the outside of the casing, and means including a contact arm actuating bar supported on the free end of the bimetal element and normally out of engagement with the contact arm, and a toggle pin spring-pressed against the actuating bar to effect movement of the contact arm away from the contact by impact therewith and with a snap action.

3. A thermal protective device for an energy-translating device having a housing, comprising a thermal relay having a casing having an open side and securable against the housing with its open side thereagainst, a bimetal strip in the casing at the open side thereof, a bracket pivotally supported by and in the casing at one end thereof and secured to one end of the bimetal strip, a cooperating contact and contact arm on the outside of the casing, a contact arm actuating bar secured to the free end of the bimetal strip, having an end portion extending through the casing to actuate the contact arm, cooperating interfitting portions of the actuating bar and the casing acting to limit movement of the actuating bar in either direction of its movement.

4. A thermal protective device for an energy-translating device having a housing, comprising a thermal relay having a casing having an open side and securable against the housing with its open side thereagainst, a bimetal element in the casing, a bracket pivotally mounted in the casing and secured to one end of the bimetal element, a contact and a cooperating contact arm on the outside of the casing, a contact arm actuating bar secured to the free end of the bimetal element and extending laterally thereof, a toggle pin having one end engaging the actuating bar, an abutment strip secured to the casing, extending substantially parallel with the actuating bar and engaged by the other end of the toggle pin, and a toggle spring having one end connected to the abutment strip and its other end connected to the casing.

5. A device as set forth in claim 2 and including a latch to hold the actuating bar in its actuated position and thereby hold the contact arm out of engagement with the contact.

6. A device as set forth in claim 2 and including a latch strip on the outside of the casing and interfitting with the actuating bar to hold the same in its actuated position.

7. A device as set forth in claim 2 and including a latch strip on the outside of the casing interfitting with the actuating bar spring and biased into engagement with the actuating bar to hold the same in its actuated position, and manually actuable means to move the latch to permit return of the actuating bar and contact arm to their normal positions.

VICTOR G. VAUGHAN.
EARL K. CLARK.